United States Patent [19]

Steagall et al.

[11] Patent Number: 5,079,074
[45] Date of Patent: Jan. 7, 1992

[54] DUAL DENSITY NON-WOVEN BATT

[75] Inventors: Darrell C. Steagall, Gastonia; William C. Hoyle, Jr., Rockwell, both of N.C.; George G. Gabrel, Tupelo, Miss.

[73] Assignee: Cumulus Fibres, Inc., Charlotte, N.C.

[21] Appl. No.: 576,603

[22] Filed: Aug. 31, 1990

[51] Int. Cl.⁵ .................................. B32B 7/02
[52] U.S. Cl. .................................. 428/218; 428/280; 428/282; 428/284; 428/287; 428/289; 428/290; 428/296; 428/447
[58] Field of Search .............. 428/218, 280, 282, 284, 428/296, 395, 287, 289, 290, 447

[56] References Cited

U.S. PATENT DOCUMENTS

| | | | |
|---|---|---|---|
| 2,483,405 | 10/1944 | Francis | 428/296 |
| 2,500,282 | 3/1950 | Francis | 34/115 |
| 2,835,047 | 5/1958 | Fleissner et al. | 34/115 |
| 3,043,018 | 7/1962 | Fleissner | 34/115 |
| 3,088,859 | 5/1963 | Smith | 264/119 |
| 3,196,555 | 7/1965 | Friedel et al. | 34/115 |
| 3,281,951 | 11/1966 | Greene | 34/121 |
| 3,362,079 | 1/1968 | Fleissner | 34/115 |
| 3,380,175 | 4/1968 | Fleissner et al. | 34/115 |
| 3,510,389 | 5/1970 | Olson | 156/296 |
| 3,616,031 | 10/1971 | Fleissner | 156/285 |
| 3,616,035 | 10/1971 | Basuerville et al. | 156/296 |
| 3,619,322 | 11/1971 | Fleissner | 156/62.2 |
| 3,765,971 | 10/1973 | Fleissner | 156/62.2 |
| 3,839,146 | 10/1974 | Fleissner | 34/115 |
| 4,129,675 | 12/1978 | Scott | 428/288 |
| 4,195,112 | 3/1980 | Sheard et al. | 428/288 |
| 4,297,404 | 10/1981 | Nguyen | 428/218 |
| 4,359,132 | 11/1982 | Parker et al. | 428/288 |
| 4,373,000 | 2/1983 | Knoke et al. | 428/288 |
| 4,377,615 | 3/1983 | Suzuki et al. | 156/176 |
| 4,391,869 | 5/1983 | Cook et al. | 428/218 |
| 4,418,031 | 11/1983 | Doerer et al. | 428/288 |
| 4,463,048 | 7/1984 | Dickson et al. | 156/62.8 |
| 4,474,846 | 10/1984 | Doerer et al. | 428/288 |
| 4,477,515 | 10/1984 | Masuda et al. | 428/288 |
| 4,490,427 | 12/1984 | Grant et al. | 428/288 |
| 4,518,642 | 5/1985 | Johnston et al. | 428/288 |
| 4,532,099 | 7/1985 | Kaji | 156/285 |
| 4,542,060 | 9/1985 | Yoshida et al. | 428/284 |
| 4,568,581 | 2/1986 | Peoples | 428/296 |
| 4,668,562 | 5/1987 | Street | 428/296 |

Primary Examiner—James J. Bell
Attorney, Agent, or Firm—W. Thad Adams, III

[57] ABSTRACT

A dual layer, dual density batt having a first batt layer comprising at least first and second staple polymer fiber constituents forming a homogeneous intermixture of the fibers, at least some of the fibers in the first or second fiber constituents having a relatively low predetermined melting temperature and the remainder of the fiber in the first or second fiber constituents having a relatively high predetermined melting temperature and a second batt layer comprising at least first and second staple polymer fiber constituents forming a homogeneous intermixture of the fibers. At least some of the fibers in the first or second fiber constituents have a relatively low predetermined melting temperature and the remainder of the fiber in the first or second fiber constituents have a relatively high predetermined melting temperature. The first and second fiber constituents of the first batt layer comprise a different proportion or selection of fibers from the second batt layer to produce a different density in the first and second batt layers upon compression. The first and second fiber batt layers are overlaid to define a multi-layer web structure having intimately interconnected and fused first and second batt layers and intimately interconnected and fused first and second fiber constituents in both first and second batt layers. The first batt layer has a relatively high density and the second batt layer has a relatively low density. Both first and second batt layers of the batt are resiliently compressible to at least one-third of the uncompressed thickness.

17 Claims, 1 Drawing Sheet

DUAL DENSITY NON-WOVEN BATT

TECHNICAL FIELD AND BACKGROUND OF THE INVENTION

This invention relates to a dual density non-woven batt. The batt is characterized by having a relatively high density layer and a relatively low density layer which renders it suitable for uses such as mattresses, furniture upholstery and similar applications where variable density and resistance against compression is desired, together with substantial resilience which will return the batt to its shape and thickness after compression for an indefinite number of cycles.

There are a number of advantages to be achieved by construction of batts for use as mattresses and upholstery from synthetic, staple fiber material. Such fibers are inherently lightweight and therefore easy to ship, store and manipulate during fabrication. These fibers are also generally less moisture absorbent than natural fibers such as cotton, or cellulosic based synthetic fibers such as rayon. Therefore, products made from these fibers can be maintained in a more hygienic condition and dried with much less expenditure of energy. Many such fibers also tend to melt and drip rather than burn. While some of these fibers give off toxic fumes, the escape of such fumes can be avoided or minimized by encapsulating the batt in a fire retardant or relatively air impermeable casing. In contrast, fibers such as cotton burn rapidly at high heat and generate dense smoke.

However, synthetic staple fibers also present certain processing difficulties which have heretofore made the construction of a relatively dense non-woven batt from synthetic staple fibers difficult and in some cases impractical. For example, the resiliency inherent in synthetic fibers such as nylon and polyester is caused by the plastic memory which is set into the fiber during manufacture. By plastic memory is meant simply the tendency of a fiber to return to a given shape upon release of an externally applied force. Unless the plastic memory is altered by either elevated temperature or stress beyond the tolerance of the fiber, the plastic memory lasts essentially throughout the life of the fiber. This makes formation of a batt by compressing a much thicker, less dense batt very difficult because of the tendency of the fibers to rebound to their original shape. Such fiber batts can be maintained in a compressed state, but this has sometimes involved the encapsulation of the batt in a cover or container. All of these methods create other problems such as unevenness and eventual deterioration of the batt due to fiber shifting, breakage and breakdown of the mechanical structure which maintains the compressed batt.

Batts formed of constituent parts having varying densities are known in the prior art. However, none are known in which both parts remain highly compressible. For example, one known product comprises a relatively thick batt layer onto which is secured in some manner a very thin, compressed, almost cardboard-like layer of fibers which cannot be further compressed to any significant degree. This thin layer is a very small fraction of the thickness of the batt.

Several prior art processes can be used to compress the batt into its desired density, such as by use of engaging members such as rollers or plates on both sides of the batt. In effect, the batt is heated simultaneously from both sides to the point where its elastic memory is relaxed. However, the batt must then be removed from the rollers, plates or the like which have held the batt in its compressed state. Even with the use of TFE or other similarly coated rollers or plates, sticking is a common problem. In addition, even heating is inherently difficult to obtain since the fibers in contact with the heated metal surfaces are heated almost instantly whereas fibers in the interior of the batt are heated at a much slower rate. If the rollers between which the batt is traveling ar heated to the extent necessary to completely relax the plastic memory of the fibers on the interior of the batt, quite often the fibers in intimate contact with the rollers will melt completely or disintegrate. If the rollers are cooled to avoid complete melting of the fibers on the outer surface of the batt, the interior fibers are not heated sufficiently to reset their plastic memory. In this event, the outer fibers are constantly being pushed against from the interior by fibers whose plastic memory is constantly attempting to cause the fibers to reassume their original shape. Attempts to correct this problem have included varying the percentage of fibers having relatively different melting temperatures through the cross-section of the batt or providing fibers on the interior of the batt having a relatively lower temperature at which the elastic memory is relaxed.

Prior patent numbers 4668562 and 4753693, both owned by applicant here, disclose the use of a sufficient vacuum suction through a perforated roller to draw the batt down into its desired thickness during the heating and compression stages of processing. The compressed batt is cooled and maintains the compressed thickness after cooling. The process disclosed in these patents is useful in the practice of the invention disclosed and claimed in this application and is disclosed here as the preferred embodiment for forming the dual density batt, although certainly not the only suitable means of doing so.

SUMMARY OF THE INVENTION

Therefore, it is an object of the invention to provide a non-woven batt having first and second layers of varying density.

It is another object of the present invention to provide a wherein the fibers of the batt are fused together from one side to the other by heated air.

It is another object of the present invention to provide a non-woven batt formed into a desired thickness by vacuum pressure through the thickness of the batt.

It is yet another object of the invention to provide a vacuum bonded non-woven batt wherein the desired density and thickness of the batt can be maintained without physically compressing the batt between rollers, plates or the like during manufacture.

These and other objects and advantages of the present invention are achieved by providing a dual layer, dual density batt, comprising a first batt layer comprising at least first and second staple polymer fiber constituents forming a homogeneous intermixture of the fibers, at least some of the fibers in the first or second fiber constituents having a relatively low predetermined melting temperature and the remainder of the fiber in the first or second fiber constituents having a relatively high predetermined melting temperature and a second batt layer comprising at least first and second staple polymer fiber constituents forming a homogeneous intermixture of the fibers. At least some of the fibers in the first or second fiber constituents have a relatively low predetermined melting temperature and the remainder of the fiber in the first or second fiber constituents have a relatively high predetermined melting temperature. The first and second fiber constituents of the first batt layer comprise a different proportion or selection of fibers from the second batt layer to produce a different density in the first and second batt layers upon compression. The first and second fiber batt layers are overlaid to define a multi-layer web structure having intimately interconnected and fused first and second batt layers and intimately interconnected and fused first and second fiber constituents in both first and second batt layers. The first batt layer has a relatively high density and the second batt layer has a relatively low density. Both first and second batt layers of the batt are resiliently compressible to at least one- third of the uncompressed thickness.

According to one preferred embodiment of the invention, the first, relatively high density batt layer comprises dry fibers and fibers having a relatively low melting temperature. The second, relatively low density batt layer comprises dry fibers and fibers having a relatively low melting temperature.

According to another preferred embodiment of the invention, the first, relatively high density batt layer and the second, relatively lo density batt layer both comprise slickened fiber with dry fibers in varying proportions to vary the characteristics of the batt.

According to ye another preferred embodiment of the
t invention, the relatively high density batt layer comprises approximately two-thirds by weight of the batt and the relatively low density batt layer comprises approximately one-third by weight of the batt.

According to one preferred embodiment of the invention, the dry fiber of the relatively high density batt layer comprises polyester and the low melt fiber comprises low melt polyester.

According to another preferred embodiment of the invention, the slickened fiber comprises polyester coated with a slickening finish, the dry fiber comprises polyester and the low melt fiber comprises low melt polyester.

According to yet another preferred embodiment of the invention, the slickened fiber comprises polyester coated with a slickening finish, the dry fiber comprises polyester and the low melt fiber comprises a high melting point polyester core fiber covered with a low melt polyester covering.

According to one preferred embodiment of the invention, the dry fiber of the relatively high density batt layer comprises approximately 85% by weight polyester, and the low melt fiber comprises approximately 15% by weight polyester.

According to another preferred embodiment of the invention, the dry fiber of the relatively high density batt layer comprises between approximately 50% and 85% by weight polyester, and the low melt fiber comprises between approximately 15% and 50% by weight polyester.

According to yet another preferred embodiment of the invention, the slickened fiber comprises 50% polyester, the dry fiber comprises approximately 45% polyester and the low melt fiber comprises approximately 5% polyester.

According to yet another preferred embodiment of the invention, the slickened fiber comprises 95% to 80% polyester, the dry fiber comprises approximately 95% to 80% polyester and the low melt fiber comprises approximately 5% to 20% polyester.

According to yet another preferred embodiment of the invention, the relatively high density layer of the batt weighs between approximately two and five ounces per square foot and the relatively low density layer of the batt weights between approximately seven-tenths and one and one-half ounces per square foot.

According to one preferred embodiment of the invention, the slickened fiber includes a durable, siliconized finish.

According to another preferred embodiment of the invention, the slickened fiber includes a nondurable, wax finish.

According to one preferred embodiment of the invention, the relatively high density layer of the batt is between approximately two and five inches thick when uncompressed, the relatively low density layer of the batt is between approximately one and one and one-half inches thick when uncompressed, and the thickness of the entire batt is between three and six and one-half inches thick when uncompressed.

According to one preferred embodiment of the invention, a dual layer, dual density batt has a first batt layer between approximately seven and twelve inches thick and comprising at least first and second staple polymer fiber constituents forming a homogeneous intermixture of the fibers, at least some of the fibers in the first or second fiber constituents having a relatively low predetermined melting temperature and the remainder of the fiber in the first or second fiber constituents having a relatively high predetermined melting temperature, and a second batt layer between approximately three and six inches thick comprising at least first and second staple polymer fiber constituents forming a homogeneous intermixture of the fibers, at least some of the fibers in the first or second fiber constituents having a relatively low predetermined melting temperature and the remainder of the fiber in the first or second fiber constituents having a relatively high predetermined melting temperature, and the first and second fiber constituents of the first batt layer comprising a different proportion or selection of fibers from the second batt layer to produce a different density in the first and second batt layers upon compression. The first and second fiber batt layers are overlaid to define a multi-layer web structure having intimately interconnected and fused first and second batt layers and intimately interconnected and fused first and second fiber constituents in both first and second batt layers, the first batt layer having a relatively high density and the second batt layer having a relatively low density. Both first and second batt layers of the batt being resiliently compressible to at least one third of the uncompressed thickness.

BRIEF DESCRIPTION OF THE DRAWINGS

Some of the objects of the invention have been set forth above. Other objects and advantages of the invention will appear as the description of the invention proceeds when taken in conjunction with the following drawings, in which.

DESCRIPTION OF THE PREFERRED EMBODIMENT

Figure 1:
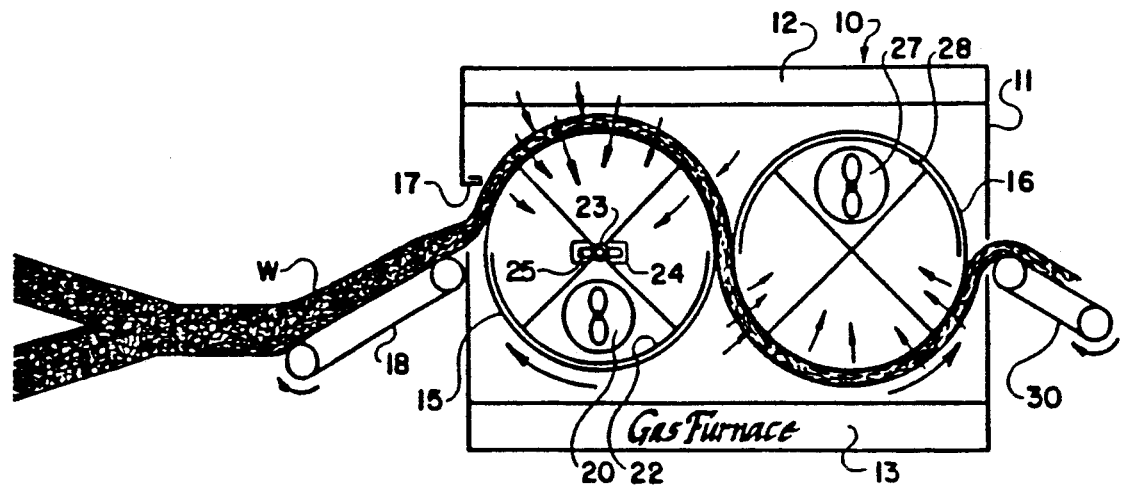
FIG. 1 is a fragmentary side elevational view of an apparatus according to which a fiber batt according to the present invention may be constructed.

A dual density batt according to the present invention in constructed by first opening and blending suitable staple fibers. The staple fibers to be used are chosen from the group defined as thermoplastic polymer fibers such as nylon and polyester. Of course, other thermoplastic fibers can be used depending upon the precise processing limitations imposed and the nature of the compressed batt which is desired at the end of the process.

The disclosure contained in this application uses polyester fiber having varying characteristics to achieve the results desired. As used in the specification and claims, the term "relatively high predetermined melting temperature fiber" is referred to as a fiber having a melting temperature of approximately 480° F. (249° C.) as compared with a "relatively low predetermined melting temperature fiber" having a melting temperature of approximately 300° F. (149° C.).

Low melt polyester of the type referred to above, as noted, has a melting temperature of approximately 230° F. (110° C.), but begins to soften and become tacky at approximately 185° F. (85° C.).

As used in this application, however, the term melting does not refer to the actual transformation of the solid polyester into liquid form. Rather, it refers to a gradual transformation of the fiber over range of temperatures within which the polyester becomes sufficiently soft and tacky to cling to other fibers within which it comes in contact, including other fibers having its same characteristics and adjacent polyester fibers having a higher melting temperature. It is an inherent characteristic of thermoplastic fibers such as polyester and nylon, that they become sticky and tacky when melted, as that term is used in this application. Melting of the fibers in the batt layers causes them to fuse to themselves and to the other polyester fibers in the mat which have not melted.

Other terms used in this application include references to "dry" and "slick" fibers. A "dry" fiber is one which is coated with a surface finish which lubricates the fiber for processing purposes but does not impart a slippery feel or hand to the fiber. A "slick" or "slickened" fiber is one which is coated with a finish which imparts a slippery or slick fell or hand to the fiber. Such a slickened fiber is referred to as being a "durable" slickened fiber if the fiber is coated with a silicone based or other finish which will stay on the fiber for a minimum of five washings. A non-durable slickened fiber is on coated with a paraffin or wax based finish which is relatively easily removed by washing.

In the several examples identified below the following fibers are used:

Slick fibers—15 denier, 3" staple polyester, such as 91H Dacron polyester(durable), Wellman T356P polyester or similar fiber (durable); Wellman T392P polyester fiber (nondurable) or similar fibers.

Dry fibers—15 denier, 3" staple low melt fiber, 15 denier, 3" staple T295 Hoechst-Celanese polyester, T375 Wellman polyester; T916 Dacron polyester (a pre blended mixture of 18% low melt fiber with 82% T76H Dacron polyester), or similar fiber.

In general, the dual layer, dual density batt is formed by first forming a batt layer which is a homogeneous blend of fibers, some of which are low melt fibers and some of which are high melt fibers, and simultaneously forming a homogeneous blend of high and low melt fibers, but with a different proportion or selection of fibers from the other batt layer, which results in different batt densities. These two batts may suitably be formed in conventional picking, opening and blending lines of the type used to open and blend staple synthetic fibers.

The opened and blended fiber intermixtures are conveyed to a web forming machine such as a garnet machine or other type of web forming machine. The thickness of a single web formed in the web formation step is combined with one or more other webs of identical construction to form each of the two batt layers. Alternatively, an air laying machine, such as a Rando webber can be used to form a thick, single layer web structure for each of the two batt layers Further discussion relates to the multi-layer web structure formed by a garnet machine.

Once formed, the two web structures formed into a multi-layer web structures by means of an apparatus which festoons multiple thicknesses of the web onto a moving conveyor, such as a slat conveyor, in progressive overlapping relationship. The number of layers which make up the multi-layer web structure is determined by the speed of the conveyor in relation to the speed at which successive layers of the web are layered on top of each other. The two batt layers are then overlaid to form a single, very thick multi-layer web structure.

In general, the denser, firmer side of the batt will be formed by the batt layer which has the "dry fibers" as the primary constituent parts. The less dense, softer side of the batt will be formed by the batt layer which has the slickened fibers as the primary constituent parts. For convenience, therefore, the two batt layers will be referred to as the "firm" and "soft" sides.

Once the multi-layer web structure is formed, it is moved successively onto first and second rotating drums where the web structure batt is simultaneously compressed by vacuum and heated so that the relatively low melting point polyester melts (softens) to the extent necessary to fuse to itself and to the other polyester fibers having a relatively higher melting point. The structure is cooled to reset the plastic memory of the relatively low melting point polyester to form a batt having a density and thickness substantially the same as when the batt was compressed and heated on the rotating drums. The varying construction of the two batt layers results in a relatively thick batt having one batt layer on one side of the batt which has a relatively high density and is therefore relatively firm, and another batt on the other side of the batt which has a relatively lower density and is therefore relatively soft. Both batt layers as well as the entire bonded batt are resiliently compressible to at least one third of the uncompressed thickness—returning to the uncompressed thickness when the compressing pressure is released.

Then, as desired, the batt may be covered with a suitable cover such as mattress ticking or upholstery to form a very dense and resilient cushion-like material.

The resulting construction offers substantial advantages over materials of equivalent density such as polyurethane foam. The resulting cushions or mattresses are usable in environments such as aircraft and prisons where a relatively high degree of fire retardancy and relatively low output of toxic fumes is desired. Polyester is particularly desirable from this standpoint, since it does not flash-burn and is self-extinguishing. When fully melted to liquid state, polyester drops off when exposed to flame or rolls, with a black, waxy edge forming along the effected area. By enclosing the entire batt within a cover, a much safer product than either foam or cotton is achieved.

Figure 2:
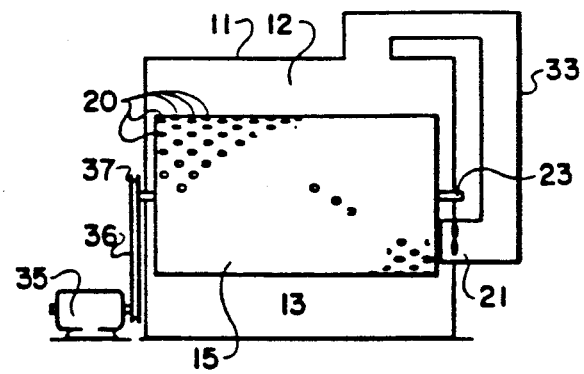
FIG. 2 is a fragmentary end elevational view showing one of the rotating drums shown in FIG. 1 with associated drive and vacuum components.

Referring now to FIG. 2, an oven 10 by which the method described above may be carried out is shown. Oven 10 includes a large substantially rectangular sheet metal housing 11, the upper extent of which comprises an air recirculation chamber. A one million BTU (252,000 kg-cal) gas furnace 13 is positioned in the lower portion of housing 11. Upward movement of the heated air from gas furnace 13 through the housing provides the heat necessary to soften and melt the polyester.

Figure 3:
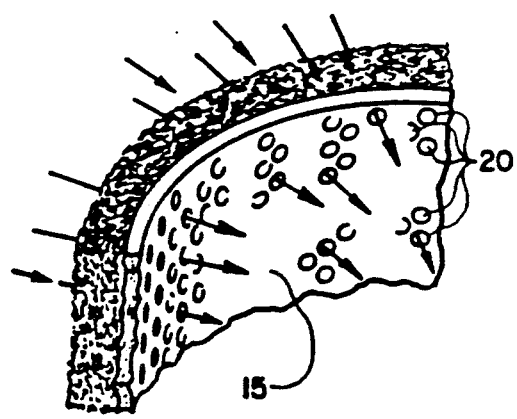
FIG. 3 is an enlarged, fragmentary perspective view showing the perforated surface of one of the drums with the vacuum-compressed multi-layer web structure in position thereon.

Two counter-rotating drums 15 and 16, respectively, are positioned in the central portion of housing 11. Drum 15 is positioned adjacent an inlet 17 through which the multi-layer web structure W is fed. The web structure is delivered from the upstream processes described above by means of a feed apron 18 through inlet 17. Drum 15 is approximately 55 inches (140 cm) in diameter and is perforated with a multiplicity of holes 20 (see FIG. 3) in the surface to permit the flow of heated air.

In the embodiment illustrated in this application, the drum has thirty holes per square inch (4.7 per sq.cm) with each hole 20 having a diameter of three thirty-seconds of an inch (2.4 mm).

A suction fan 21 having a diameter of 42 inches (107 cm) is positioned in communication with the interior of drum 15. As is also shown by continued reference to FIG. 1, the lower one half of the circumference of drum 15 is shielded by an imperforate baffle 22 so positioned inside drum 15 that suction-creating air flow is forced to enter drum 15 through the holes 20 in the upper half.

Drum 15 may be if desired mounted for lateral sliding movement relative to drum 16 by means of a shaft 23 mounted in a collar 24 having an elongate opening 25. Once adjusted, shaft 23 can be locked in any given position within collar 24 by any conventional means such as a locking pillow block or the like. (Not shown). This is not presently the preferred method. Rather, it has been found sufficient for the examples set out in this application to fix the drums 15 and 16 six inches (15cm) apart.

Drum 16 is mounted immediately downstream from drum 15 in housing 11. Drum 16 includes a ventilation fan 27, also having a diameter of 42 inches (107 cm). Note that fans 21 and 27 are shown in FIG. 1 in reduced size for clarity. An imperforate baffle 28 positioned inside drum 16 and enclosing the upper half of the circumference of drum 16 forces suction creating air flow to flow through the holes 20 in the lower half of the drum surface.

Preferably, the drum 16 contains the same number and size holes 20 as described above with reference to drum 15. The exiting batt is simultaneously cooled and carried away from housing 11 by a feed apron 30. Alternatively, the batt may be cooled by passing it over a third rotating drum through which cool air is calculated.

Both drums are ventilated and driven in the manner shown in FIG. 2. As is shown specifically with reference to drum 15, fan 21 recirculates heated air back to the ventilation chamber of 12 of housing 11 by means of a recirculating conduit 33. Drum 15 is driven in a conventional manner by means of an electric motor 35 connected by suitable drive belting 36 to a drive pulley 37.

Referring again to FIG. 1, multi-layer web structure W in uncompressed form enters housing 11 through inlet 17. Suction applied through the holes 20 in drum 15 immediately force the web structure W tightly down onto the rotating surface of drum 15 and by air flow through the holes 20 and through the porous web structure. As is apparent, the extent to which compression takes place at this point can be controlled by the suction exerted through drum 15 by fan 21. The air temperature is approximately 260-310° F. (126-154° C.). Other fibers require different air temperatures.

By continued reference to FIG. 1, it is seen that one side of the web is in contact with drum 15 along its upper surface. At a point between drum 15 and drum 16, the web is transferred to drum 16 so that the other side of the web is in contact with the surface of drum 16 and the surface which was previously in contact with drum 15 is now spaced-apart from the surface of drum 16. In effect, a reverse flow of air is created. It has been found that an extraordinarily uniform degree of heating takes place by doing this. Therefore, the polyester fibers having a relatively low melting temperature can be melted throughout the thickness of the web without any melting of the polyester fibers having the relatively high melting temperature.

As noted above, drums 15 and 16 are locked six inches apart. It has been found that this is sufficient for batts with the general range of thicknesses set out in the examples below.

Alternatively, batts of differing thicknesses may under some circumstances require a variation in the distance between the drums in order to maintain constant vacuum pressure on the web throughout the housing. It is important that intimate contact between the web structure and either drum 15 or 16 be maintained at all times. For example, if the space between the adjacent surfaces of drum 15 and 16 was 5 inches (12.7 cm) and the thickness of the web being transferred at that point was only 3 inches (7.6 cm), a relatively thin length of drum surface on both drums 15 and 16 would be exposed to the free flow of air therethrough. The unrestricted flow of air could damage the web structure. Furthermore, vacuum would not be exerted on the web for a portion of the distance between drum 15 and 16, thereby allowing the polyester fibers having the relatively high melting temperature and which still retain their plastic memory to begin to resume their uncompressed state. This would cause undesirable movement between the softened low melt polyester fibers and the adjacent polyester fibers having the higher melting temperature. Therefore, shaft 23 is adjusted in opening 24. The adjustment is made according to the thickness of the web being processed so that the distance between adjacent surfaces of drum 15 and 16 very closely approximate the thickness of the web in its compressed state as it is transferred from drum 15 to drum 16. Assuming a web thickness of 4 inches (10 cm) in its compressed state on drum 15, the distance between adjacent surfaces of drums 15 and 16 in FIG. 5 would be 4 inches (10 cm). To manufacture a Web having less thickness, drums 15 and 16 would be moved closer together by sliding shaft 23 forward in opening 24 so that, for example, the distance between drums 15 and 16 would be 2 inches (5 cm) when processing a 2 inch (5 cm) web. Conversely, to process a thicker web, shaft 23 would be moved rearwardly in opening 24 thereby moving drum 15 away from drum 16 so that, again, the thickness of the distance between adjacent surfaces of drums 15 and 16 closely approximates the thickness of the web in its compressed state. It is important to note that the web structure is not being compressed by the adjacent drum surfaces at this point. Compression continues to occur only because of vacuum pressure.

To create a dual density batt according to the process of this invention a wide variety of variations in machine operation and batt construction may be used. According to a preferred embodiment, the "firm" batt layer is placed adjacent the feed apron 18 with the "soft" side on top so that when the web structure enters oven 10, the firm layer contacts drum 15. Relatively high vacuum and high temperature in the drum 15 area effectively melts the low melt binder fibers as heated air passes through both soft and firm batt layers.

As is shown in FIG. 1, as the web structure passes from drum 15 to drum 16, the top, soft side passes into contact with drum 16, which operates at a somewhat lower vacuum and at a somewhat lower temperature. The lower temperature and vacuum pressure in the area of drum 16 are sufficient to complete the melting of the low melt fibers and bind the web structure into a compressed batt which will retain its thickness when cooled.

Alternatively, a dual density batt can be created only by varying the content of the two batt layers, with the temperature and vacuum pressure in both drum areas of the oven 10 being the same.

Once the batt leaves housing 11 it cools very rapidly into a dense batt having the same thickness as when processed in housing 11. Cooling rehardens the low melt polyester fibers, fusing the low melt polyester fibers to themselves and also to the fibers having the relatively higher melting temperature. Because of the compression created by the vacuum, many fibers from the adjacent web layers fuse to each other. The result is a dual density batt, where each of the two batt layers have a homogeneous structure which, from visual observation, does not appear to have been constructed from a plurality of thinner layers. The higher percentage of low melt fibers in the firm batt layer causes more binding of the fibers together when the low melt fibers melt The result is a batt which, while being held in a relatively dense, compressed state nevertheless has considerable resiliency.

The following tables set out several examples of dual density batts which can be constructed according to the method of this invention, together with the parameters used to carry out the process.

TABLE 1

| | BATT FIBER CONTENT | |
|---|---|---|
| | FIRM SIDE | SOFT SIDE |
| BATT A | 85% DRY FIBER<br>15% LOW MELT<br>(70% by weight) | 50% SLICK<br>25% DRY FIBER<br>25% duPont 916<br>(30% by weight) |
| BATT B | 85% DRY FIBER<br>15% LOW MELT<br>(79% by weight) | 50% SLICK<br>25% DRY FIBER<br>25% duPont 916<br>(21% by weight) |

TABLE 1-continued

| | BATT FIBER CONTENT | |
|---|---|---|
| | FIRM SIDE | SOFT SIDE |
| BATT C | 85% DRY FIBER<br>15% LOW MELT<br>(83% by weight) | 50% SLICK<br>25% DRY FIBER<br>25% duPont 916<br>(17% by weight) |
| BATT D | 85% DRY FIBER<br>15% LOW MELT<br>(83% by weight) | 50% SLICK<br>25% DRY FIBER<br>25% duPont 916<br>(17% by weight) |
| BATT E | 85% DRY FIBER<br>15% LOW MELT<br>(77% by weight) | 50% SLICK<br>25% DRY FIBER<br>25% duPont 916<br>(23% by weight) |

TABLE 2

| PROCESSING PARAMETERS | |
|---|---|
| BATT A | |
| COOLING ZONE SPEED | 9 FT./MIN. @ 40" WIDTH |
| TEMPERATURE-ZONE 1 | 300° F. |
| TEMPERATURE-ZONE 2 | 300° F. |
| FAN SPEED-ZONE 1 | 600 RPM |
| FAN SPEED-ZONE 2 | 400 RPM |
| COOLING ZONE HEIGHT | 3.5" |
| BATT B | |
| COOLING ZONE SPEED | 10.5 FT./MIN. @ 72" WIDTH |
| TEMPERATURE-ZONE 1 | 300° F. |
| TEMPERATURE-ZONE 2 | 300° F. |
| FAN SPEED-ZONE 1 | 500 RPM |
| FAN SPEED-ZONE 2 | 450 RPM |
| COOLING ZONE HEIGHT | 4.5" |
| BATT C | |
| COOLING ZONE SPEED | 9 FT./MIN. @ 40" WIDTH |
| TEMPERATURE-ZONE 1 | 300° F. |
| TEMPERATURE-ZONE 2 | 300° F. |
| FAN SPEED-ZONE 1 | 600 RPM |
| FAN SPEED-ZONE 2 | 400 RPM |
| COOLING ZONE HEIGHT | 4.5" |
| BATT D | |
| COOLING ZONE SPEED | 9.9 FT./MIN. @ 60" WIDTH |
| TEMPERATURE-ZONE 1 | 300° F. |
| TEMPERATURE-ZONE 2 | 280° F. |
| FAN SPEED-ZONE 1 | 433 RPM |
| FAN SPEED-ZONE 2 | 300 RPM |
| COOLING ZONE HEIGHT | 6.5" |
| BATT E | |
| COOLING ZONE SPEED | 11.5 FT./MIN. @ 72" WIDTH |
| TEMPERATURE-ZONE 1 | 280° F. |
| TEMPERATURE-ZONE 2 | 275° F. |
| FAN SPEED-ZONE 1 | 500 RPM |
| FAN SPEED-ZONE 2 | 300 RPM |
| COOLING ZONE HEIGHT | 3" |

TABLE 3

| | BATT THICKNESS BEFORE COMPRESSION | |
|---|---|---|
| | FIRM SIDE (IN.) | SOFT SIDE (IN.) |
| BATT A | 9-11 | 3.5-5.5 |
| BATT B | 8-10 | 3-5 |
| BATT C | 10-12 | 4-6 |
| BATT D | 10-12 | 4-6 |
| BATT E | 7-9 | 3-5 |

TABLE 4

| | BATT THICKNESS AFTER COMPRESSION & BONDING | |
|---|---|---|
| | FIRM SIDE (IN.) | SOFT SIDE (IN.) |
| BATT A | 2.0 | 1.25 |
| BATT B | 3.0 | 1.25 |
| BATT C | 3.0 | 1.25 |
| BATT D | 4.5 | 1.50 |
| BATT E | 2.25 | 1.00 |

TABLE 5

| | BATT DENSITY | | | |
|---|---|---|---|---|
| | OUNCES/SQUARE FOOT | | OUNCES/BOARD FOOT | |
| | FIRM SIDE | SOFT SIDE | FIRM SIDE | SOFT SIDE |
| BATT A | 3.50 | 1.50 | 1.75 | 1.20 |
| BATT B | 3.15 | .85 | 1.05 | .68 |
| BATT C | 5.00 | 1.00 | 1.67 | .80 |
| BATT D | 5.00 | 1.00 | 1.11 | .67 |
| BATT E | 2.30 | .70 | 1.02 | .70 |

In each case, both firm and soft sides of the dual density batt are highly compressible and rebound when compression is released. Other variations include the inclusion of additional layers into the dual density batt, including those which may not be themselves highly compressible. The layers may be between the dual density layers or covering one or both of the dual density layers.

A dual density non-woven batt is described above. Various details of the invention may be changed without departing from its scope. Furthermore, the foregoing description of the preferred embodiment according to the present invention is provided for the purpose of illustration only and not for the purpose of limitation—the invention being defined by the claims.

I claim:

1. A dual layer, dual density batt, comprising:
   (a) a first batt layer comprising at least first and second staple polymer fiber constituents forming a homogeneous intermixture of said fibers, at least some of said fibers in said first or second fiber constituents having a relatively low predetermined melting temperature and the remainder of said fiber in said first or second fiber constituents having a relatively high predetermined melting temperature;
   (b) a second batt layer comprising at least first and second staple polymer fiber constituents forming a homogeneous intermixture of said fibers, at least some of said fibers in said first or second fiber constituents having a relatively low predetermined melting temperature and the remainder of said fiber in said first or second fiber constituents having a relatively high predetermined melting temperature, and said first and second fiber constituents of said first batt layer comprising a different proportion or selection of fibers from the second batt layer to produce a different density in said first and second batt layers upon compression;
   (c) said first and second fiber batt layers being overlaid to define a multi-layer web structure having intimately interconnected and fused first and second batt layers and intimately interconnected and fused first and second fiber constituents in both first and second batt layers, said first batt layer having a relatively high density and said second batt layer having a relatively low density; and
   (d) both first and second batt layers of the batt being resiliently compressible to at least one third of the uncompressed thickness.

2. A batt according to claim 1, wherein the first, relatively high density batt layer comprises:
   (a) dry fibers; and
   (b) fibers having a relatively low melting temperature; and the second, relatively low density batt layer comprises:
   (c) fibers having a slickening finish applied to the surface thereof;
   (d) dry fibers; and
   (e) fibers having a relatively low melting temperature.

3. A batt according to claim 1, wherein the first, relatively high density batt layer comprises:
   (a) dry fibers; and
   (b) fibers having a relatively low melting temperature; and the second, relatively low density batt layer comprises:
   (c) dry fibers; and
   (d) fibers having a relatively low melting temperature.

4. A batt according to claim 1, wherein the first, relatively high density batt layer and the second, relatively low density batt layer both comprise slickened fiber with dry fibers in varying proportions to vary the characteristics of the batt.

5. A batt according to claim 4, wherein the relatively high density batt layer comprises approximately two-thirds by weight of the batt and the relatively low density batt layer comprises approximately one-third by weight of the batt.

6. A batt according to claim 4, wherein the dry fiber of the relatively high density batt layer comprises polyester and the low melt fiber comprises low melt polyester.

7. A batt according to claim 4, wherein the slickened fiber comprises polyester coated with a slickening finish; the dry fiber comprises polyester and the low melt fiber comprises low melt polyester.

8. A batt according to claim 4, wherein the slickened fiber comprises polyester coated with a slickening finish; the dry fiber comprises polyester and the low melt fiber comprises a high melting point polyester core fiber covered with a low melt polyester covering.

9. A batt according to claim 4, wherein the dry fiber of the relatively high density batt layer comprises approximately 85% by weight polyester, and the low melt fiber comprises approximately 15% by weight polyester.

10. A batt according to claim 4, wherein the dry fiber of the relatively high density batt layer comprises between approximately 50% and 85% by weight polyester, and the low melt fiber comprises between approximately 15% and 50% by weight polyester.

11. A batt according to claim 4, wherein the slickened fiber comprises 50% polyester; the dry fiber comprises approximately 45% polyester and the low melt fiber comprises approximately 5% polyester.

12. A batt according to claim 4, wherein the slickened fiber comprises 95% to 80% polyester; the dry fiber comprises approximately 95% to 80% polyester and the low melt fiber comprises approximately 5% to 20% polyester 13. A batt according to claim 1, wherein the relatively high density layer of the batt weighs between approximately two and five ounces per square foot and the relatively low density layer of the batt weights between approximately seven-tenths and one and one-half ounces per square foot.

14. A batt according to claim 4, wherein said slickened fiber includes a durable, siliconized finish.

15. A batt according to claim 4, wherein said slickened fiber includes a nondurable, wax finish.

16. A batt according to claim 1, wherein the relatively high density layer of the batt is between approximately two an five inches thick when uncompressed, the relatively low density layer of the batt is between approximately one and one and one-half inches thick when uncompressed, and the thickness of the entire batt is between three and six and one-half inches thick when uncompressed.

17. A dual layer, dual density batt, comprising:
(a) a first batt layer between approximately seven and twelve inches thick and comprising at least first and second staple polymer fiber constituents forming a homogeneous intermixture of said fibers, at least some of said fibers in said first or second fiber constituents having a relatively low predetermined melting temperature and the remainder of said fiber in said first or second fiber constituents having a relatively high predetermined melting temperature;
(b) a second batt layer between approximately three and six inches thick comprising at least first and second staple polymer fiber constituents forming a homogeneous intermixture of said fibers, at least some of said fibers in said first or second fiber constituents having a relatively low predetermined melting temperature and the remainder of said fiber in said first or second fiber constituents having a relatively high predetermined melting temperature, and said first and second fiber constituents of said first batt layer comprising a different proportion or selection of fibers from the second batt layer to produce a different density in said first and second batt layers upon compression;
(c) said first and second fiber batt layers being overlaid to define a multi-layer web structure having intimately interconnected and fused first and second batt layers and intimately interconnected and fused first and second fiber constituents in both first and second batt layers, said first batt layer having a relatively high density and said second batt layer having a relatively low density; and
(d) both first and second batt layers of the batt being resiliently compressible to at least one third of the uncompressed thickness.

* * * * *